United States Patent Office 3,507,818
Patented Apr. 21, 1970

3,507,818
SEALANTS FOR FLUID CONTAINERS
Robert Lee Roach, West Chester, Pa., assignor to West Chester Chemical Company, West Chester, Pa., a corporation of Pennsylvania
No Drawing. Continuation of application Ser. No. 127,819, July 31, 1961. This application June 16, 1966, Ser. No. 557,905
Int. Cl. C08d 7/14, 7/18
U.S. Cl. 260—17                     12 Claims

ABSTRACT OF THE DISCLOSURE

A stable, liquid, sealant composition for sealing and coating leaks in conduits, vessels, reservoirs, packing joints or surfaces of same, said surfaces having an electrical charge, the composition comprising a cationic elastomeric rubbery solids, a curing accelerator and a curing agent and a cationic and/or a non-ionic surface active agent.

---

This application is a continuation of application filed July 31, 1961, Ser. No. 127,819, which is itself a continuation-in-part of application Ser. No. 685,784, filed Sept. 24, 1957, and both now abandoned.

My invention relates to sealants, and it relates more particularly to sealants which are adapted to be used in sealing conduits such for instance as pipes, vessels such for instance as underground reservoirs, and packing and joints relating to same.

In the use of underground conduits, as for instance those consisting of pipelines comprising bell and spigot joints, serious problems have arisen, particularly in instances where the conduit is used for conveying illuminating gas. In communities where such conduits were laid for manufactured illuminating gas, it has been customary for the bell and spigot joints to be packed with caulked jute or other fibrous material, and the outside of the joint itself caulked. The water vapor content of manufactured gas was sufficient to keep the jute in a swollen state and thereby maintain the joint in fully packed condition. In communities of this kind, where manufactured gas was replaced by natural gas, it was discovered that instead of retaining the moisture in the jute packing, the flow of dry natural gas aspirated the moisture out of the jute packing, thereby effecting a shrinkage of the jute. This in many instances resulted in the formation of leaks in the bell and spigot joints. Moreover, such pipe lines were, as a rule, laid in the bed of streets and are subject to the stresses of forces transmitted to them by the pounding and vibration of vehicular traffic on said streets, or by settling of the pipe due to undermining or other causes. So long as the jute remained charged with moisture, the packing was sufficiently resilient to yield to these forces without relinquishing its packing pressure. But when the jute was dried out, it lost its internal pressure which forced the packing fibers into resilient contact one with another, and against the walls of the bell and spigot joint or the caulking thereof. Instead, said pounding and vibration or settling forces not only tend to maneuver the dry jute loose from said walls or caulking, but also tend to separate the dry fibers of the jute, one from another. Thus the tendency toward leakage is further enhanced.

Hitherto, such leaks were corrected either by removing the pavement and experimentally digging down to the pipe in an effort first to locate the leak and then to remedy the same by replacing or cementing the packing, or by the use of expensive and complex machinery for larger diameter pipes to locate a given joint and internally apply cement thereto. In either event, the process was not only uncertain and costly but required the gas main to be out of use for a relatively long time. Moreover, attempts to restore the swollen state of the fibrous packing have had fugitive results, due to drying or leaching of the material used.

I have discovered that by the use of my novel sealant compositions it is possible to seal a conduit or vessel, whether of the gas main type or otherwise, and whether it incorporates a jute or other fiber packing or otherwise, without removing the paving or digging, or using expensive or complex machinery. Moreover, it is accomplished in a minimum of time and with a maximum assurance that the leak will be readily found and completely sealed, the sealing being dependable and substantially permanent, and without adversely affecting the flow of nature of the fluid carried or held by said conduit or vessel. Not only so, but my invention makes it possible to seal actual fissures in the conduit or vessel, which formerly would require patching, caulking or actual replacement.

Hitherto, it has been considered impracticable to attempt to seal underground gas mains with a sealant containing latex, for latex has the well-known characteristic of a tendency readily to coagulate under any of various conditions including conditions which would be present when latex is introduced into an underground gas main. Such coagulation could well result in plugging the gas main and thereby ruining it and making it necessary to dig it out of the street and replacing it with another main.

According to my invention I provide a sealant containing latex of such stability that it will not coagulate in the mass, but of such characteristic that it will quickly coagulate, and cure to form a permanent solid rubbery substance when it is deposited on a wall or joint requiring a seal. This composition, contrary to the normally to be expected result of using latex, makes it possible to pump large quantities of sealant into an underground gas main and then to pump it out of same, all without coagulation, while leaving a deposit of sealant on the interior walls and joints, which deposit almost at once begins to coagulate and to cure into a permanent seal, while the pumped out liquid can be re-used over and over again for the same purpose without at any time coagulating other than in the above-mentioned deposited condition.

In the practice of my invention, I employ a sealant compositon which is pumped or otherwise introduced into the interior of the conduit or vessel while in a liquid state until the receptacle is as nearly full as possible. By a combination of capillary action, hydrostatic pressure, and ionic attraction, the sealant flows into and penetrates the fissue or joint, filling the spaces therein and particularly filling the interstices between the adjacent fibers of the packing and between the packing and the walls or caulking of the joint, and substantially wetting said walls or caulking in the process. The excess liquid sealant is then pumped or otherwise drawn out of said interior, leaving a thin film of said sealant deposited against the walls and packing. The sealant is of such a nature as not only to penetrate the interstices between adjacent fibers, but also to deposit a filler therein while at the same time embracing said fibers in such a manner as to utilize the fibers as fillers; and then on drying after the withdrawal of said excess from the interior, to cure in a relatively short time, changing the general physical characteristics from a liquid to an elastic, tough, and rubbery mass which itself packs the fissures, and cements the fibers together while anchoring the whole mass of fibers into the joint.

I have found that compositions suitable for sealing and coating leaks in conduits, vessels, reservoirs, packing and joint surfaces of same, may be made, containing as the essential components a stable aqueous dispersion of elastomeric rubbery solids having a selected ionic charge, a curing agent, a curing accelerator and a compatible surface active agent. I have also found it advantageous to include suitable reinforcing agents and in some instances additional ionic surface-active agents having the same ionic charge as that of the selected elastomeric rubbery solids. In general I have found it advantageous to use a non-ionic surface active agent because it is compatible with both positively and negatively charged latices. I may also include additional dispersion stabilizers such as polyvinyl alcohol to ensure stability of the sealant in cases where it is repeatedly re-used, as for example when it is pumped into a gas main for sealing leaks and joints therein, and excess sealant is then pumped out for reuse for sealing additional gas main sections.

The non-ionic agent serves to disperse the solid comminuted materials in the sealing compositions such as the solid curing agents, the accelerator and reinforcing agents so that they are carried along with the elastomer in dispersed condition and deposited to form a seal. The non-ionic surface-active agent also enhances the effective action of the ionic surface-active agent which may be present in the composition. The non-ionic agent also stabilizes the latex against acids, bivalent and trivalent metallic salts and the like which might be present in gas mains so that the sealant composition will not coagulate when brought into contact with these foreign materials. The pumping out and re-use of the sealant in stable condition is thus assured.

The use of additional ionic surface-active agent which has the same ionic charge as that of the latex further ensures that coagulation of the latex does not occur and also maintains the stability of the latex for long periods of time on storage as well as for repeated reuse of the sealant composition which is pumped into closed-off sections of gas mains to seal leaks therein and withdrawing most of the composition in stable dispersed condition for later use in other sections to be treated. The surface-active agent also performs the important function of an introfier, that is, as the agent which wets the surfaces to be sealed and thus permits the sealing composition to penetrate into the spaces and fissures present and to deposit in situ the sealing components of the composition.

The sealant compositions can be prepared in any suitable known manner so as to completely disperse all the solid components. The proportions of the components may be varied widely. However, I have found it advantageous for sealing purposes to maintain the total solids content of the sealant between 5% and 55% by weight. Above 55% by weight solids content, instability of the aqueous dispersion tends to occur. Below 30% by weight total solids content there may be undesirable reduction in the rate of penetration and deposition of the solids when my sealant compositions are used for example to seal leaks in gas mains having packing joints of jute or other organic fibers. Moreover, it has been found that compositions having less than 30% by weight solids content, are less adaptable for reuse.

Although the individual components of my composition per se are known, their use in a new combination to produce a stable dispersion which can be pumped into gas mains for sealing leaks and which can be pumped out for reuse until entirely used up for the same purpose while remaining fully dispersed and stable at all times, and which can be depended upon to remain so, is not taught by the prior art. Furthermore, the ionic character of the composition is preselected and predetermined by the use of components having compatible and desirable ionic characteristics, and furthermore, the ionic charge of the final composition may be predetermined so as to have an ionic charge opposite to the charge of the article to be sealed. Although it is known that natural rubber latex, for example, is anionic in character and can be anodically deposited, the utilization of selected and predetermined ionic characteristics of elastomeric latices in my sealant to assure penetration of joints having an opposite charge is an important feature of my invention. This feature in conjunction with the preferred use of both ionic and non-ionic surface-active agents and the preferred use of a low temperature cure accelerator results in remarkable coaction of all the components to solve a long-standing problem of sealing leaks effectively and at low cost.

My sealant composition is not only capable of being pumped into a gas main, and pumped out again while leaving a sealing residue therein, without coagulation, but does so without leaving a lumpy coagulation of any kind which could tend to block the working passages of the conduit. The sealant has very effective penetrating qualities, so as to penetrate all interstices of any kind which might cause leakage. In the case of jute or similar packing material, the sealant operates to strengthen the fibers while filling the spaces therebetween, adhere to the fibers and to the metallic walls of the joint, without adversely affecting the fibers in any way. The sealant is in fact of such stability that it will not coagulate because of the presence of impurities which may be contained in the gas main into which the sealant is pumped. Moreover, to make such a sealant it is necessary to form the composition in such a manner as to prevent coagulation during its manufacture. All of these requirements are completely met by my invention.

EXAMPLE 1

My preferred sealant composition for sealing leaks in gas mains and which is remarkably stable and can be re-used comprises a stable aqueous dispersion of elastomeric rubbery solids having a selected ionic charge, a solid comminuted curing agent, a solid comminuted curing accelerator, an additional ionic surface-active agent of the same ionic charge as that of the elastomeric solids, a non-ionic surface-active agent, and a dispersion stabilizer. Such composition is adapted to adhere to and penetrate leaks in gas mains when brought into contact with same, particularly when the sealant composition has an ionic-active charge opposite to the electrical charge of the contacted surface.

The following is an illustrative specific embodiment of a preferred sealant composition. The following ingredients were charged into an 18″ diameter x 18″ long pebble mill half filled with flint pebbles ranging downward in size from approximately ¾″ diameter.

| | Pounds |
|---|---|
| Water | 25.00 |
| Carbon black | 7.50 |
| Zinc oxide | 7.50 |
| Sulfur (sublimed) | 1.50 |
| Thiocarbanilide | 1.50 |
| Phenyl beta naphthylamine | 1.50 |
| Sodium hydroxide | 0.04 |
| Tert-dodecyl thioether | 0.15 |
| Ethylene oxide-rosin amine adduct (10% in water) | 4.40 |
| Long chain fatty acid amide | 0.80 |

After grinding for 24 hours with the mill rotating at 30 revolutions/minute, the charge was removed from the mill and added to cationic polychloroprene latex as follows: 73 pounds of cationic polychloroprene latex containing approximately 50% polychloroprene by weight was placed in agitated vessel, the agitation energy being equivalent to 0.5 horsepower/100 gallons. Tert-dodecyl thioether as a 25% water solution was added in a quantity of 0.10 pound. A 10% aqueous solution of polyvinyl alcohol was added in an amount of 4.5 pounds, both of these stabilizers being added with the agitator running. After the stabilizers were added to the latex and with the agitator still running, the dispersed solids from the ball mill were added to the latex at a uniform rate over a period of 5 minutes. After all of the dispersed solids were added to the latex, agitation was continued for another 5 minutes.

I have in some instances found it advantageous to add to the sealant from about 0.25% to about 0.5% by weight of total solids, excluding the rubbery elastomer, of a thickening agent, for example, a 10% aqueous solution of methyl cellulose (Methocel). Such thickening agent is especially useful for sealants which are to be re-used many times as in sealing gas mains which are particularly free of foreign materials, rust and other contaminants that might be undesirably incorporated and retained in the re-used sealant.

EXAMPLE 2

The following ingredients were charged into an 18" diameter x 18" long pebble mill half filled with flint pebbles ranging downward in size from approximately ¾" diameter.

|  | Pounds |
| --- | --- |
| Water | 25.00 |
| Carbon black | 7.50 |
| Zinc oxide | 7.50 |
| Sulfur (sublimed) | 1.50 |
| Thiocarbanilide | 1.50 |
| Phenyl beta naphthylamine | 1.50 |
| Sodium hydroxide | 0.04 |
| Tert-dodecyl thioether | 0.15 |
| Sodium salt of lignin sulfonic acid | 0.10 |

After grinding for 24 hours with the mill rotating at 30 revolutions/minute, the charge was removed from the mill and added to anionic polychloroprene latex as follows: 73 pounds of anionic polychloroprene latex containing 50% (approximately) polychloroprene by weight was placed in an agitated vessel, the agitation energy being equivalent to 0.5 horsepower/100 gallons. Tert-dodecyl thioether as a 25% water solution was added in a quantity of 0.10 pound. A 10% aqueous solution of polyvinyl alcohol was added in an amount equal to 4.5 pounds. Both of these stabilizers were added with the agitator running. After the stabilizers were added to the latex, and with the agitator still running, the dispersed solids from the ball mill were added to the latex at a uniform rate over a period of 5 minutes. After all of the dispersed solids were added to the latex, agitation was continued for another 5 minutes to assure uniformity of mixing.

EXAMPLE 3

Same as Example 2, excepting latex used was a copolymer of butadiene and styrene.

EXAMPLE 4

Same as Example 2, excepting latex used was a copolymer of butadiene and acrylonitrile.

EXAMPLE 5

Same as Example 2, excepting that an ammonia free natural rubber latex was used. This was prepared from a commercially available natural rubber latex by adding a 3% aqueous solution of potassium hydroxide at the rate of one pound per 25 pounds of 50% natural rubber latex and blowing nitrogen gas through the latex at the rate of 0.1 cubic foot/minute for 8 hours to remove the ammonia gas.

The foregoing examples are intended to illustrate and should not be inferred to limit. Indeed, any elastomeric latex may be used, care being taken to provide a cationic latex in the combination indicated for Example 1, and anionic latex for the combinations indicated in Examples 2 to 5 inclusive.

Thus, also the zinc oxide can be replaced by another curing agent. Such agents which I have found will promote an effective cure include magnesium oxide, and lead oxide; although I have found that zinc oxide is preferable.

The thiocarbanilide is one of several satisfactory low temperature cure accelerators, which are effective at ordinary room temperatures. Another one which I have found satisfactory is thiuramdisulfide. The use of low temperature accelerator makes it possible to cure the elastomer at ordinary temperatures in a short time after excess sealant composition is withdrawn from the vessel or conduit. However, other known accelerators such as zinc dimethyldithiocarbamate and tetramethylthiuramdisulfide may be used advantageously, although curing time may be longer and elevated temperatures are usually required.

The phenyl beta naphthylamine can be replaced by phenyl alpha naphthylamine, paraminophenol, or by any other suitable antioxidant.

The sodium hydroxide can be replaced by lithium hydroxide or potassium hydroxide.

The tert-dodecyl thioether can be replaced by any water soluble non-ionic surface active agent.

The sodium salt of lignin sulfonic acid can be replaced by any suitable anionic water soluble surface active agent, such for instance as either of the agents which may be obtained commercially under the trademark "Emulphor-O-N" or "Aerosol-O-T." said "Emulphor-O-N" being composed of polyethylene ether stearate, and said "Aerosol-O-T" being composed of dioctyl sodium sulfosuccinate.

The polyvinyl alcohol can be replaced by any suitable soluble stabilizing agent for the latex.

The carbon black can be replaced by any of a large number of other suitable reinforcing agents, such for instance as clays, whiting, selected pigments, and fibers. An effective reinforcing agent was found to be fiberglass of a length between $\frac{1}{16}''$ and $\frac{1}{4}''$, introduced at the final agitation stage in place of the milling stage, and preferably of the same specific gravity as that of the liquid in which it was introduced. In the case of fiber-type fillers, it was found that the ultimately cured seal was considerably toughened and strengthened by virtue of reducing the distance between anchor locations of the elastomer. The elastomer was thus shortened from anchor location to anchor location, even though the space to be filled by the sealant may have been substantially large. In this way, large fissures and indeed substantial openings in conduits were effectively sealed.

Moreover, for certain purposes a satisfactory sealant was made according to the foregoing examples with less than all the ingredients, or their replacements, specified therein. Thus, it was found that the reinforcing agent such as carbon black or its replacements, the sulphur, the curing accelerator such as the thiocarbanilide or its replacements, antioxidant such as the phenylbeta naphthylamine of its replacement, the latex stabilizer such as the polyvinyl alcohol, and in some instances the ionic surface-active agent could variously, severally or all be deleted without preventing a sealant from being made which would be satisfactory for certain purposes. However each of these ingredients contributes substantially to the sealant which I have found most desirable.

Also, in place of milling, other known means of homogenization may be used.

It has also been found that variations may be used in the proportions of ingredients, and still produce a sealant which may be satisfactory for given purposes. For instance, referring to the amounts of milled ingredients specified in Examples 1 and 2, the zinc oxide may be used in amounts between 2 pounds and 15 pounds, the sodium hydroxide may be used in amounts between .04 pound and .50 pound, the tert-dodecyl thioether may be used in amounts between .10 pound and 1.00 pound. The ethylene oxide-rosin amine adduct may be used in amounts between 3.0 pounds and 10.0 pounds, and the long chain fatty acid amide may be used in amounts between .25 pound and 3.00 pounds. The sodium salt of lignin sulfonic acid may be used in amounts between .05 pound and 1.00 pound. And in the latex composition as described prior to the introduction of the milled ingredients, the tert-dodecyl thioether may be used in amounts between .06 pound and 1.0 pound. Also the polyvinyl alcohol may be used in amounts up to 13.5 pounds.

EXAMPLE 6

A completely compounded sealant which gave a satisfactory seal for jute packed joints was made by grinding the following ingredients for 16 hours in a ball mill:

| | Grams |
|---|---|
| Water | 500 |
| Carbon black SRF | 150 |
| Zinc oxide | 150 |
| Sulfur (sublimed) | 30 |
| Thiocarbanilide | 30 |
| Phenyl beta naphthylamine | 30 |
| NaOH | 0.8 |
| Tert-dodecyl thioether | 3.0 |
| Ethylene oxide-rosin adduct (10% in $H_2O$). | 88.0 |

The above completely dispersed composition was then thoroughly dispersed with 1460 grams of cationic neoprene latex.

EXAMPLE 7

The following ingredients were ground in a ball mill for 16 hours:

| | Grams |
|---|---|
| Water | 500.0 |
| SRF carbon black | 150.0 |
| NaOh | 0.8 |
| Tert-dodecyl thioether | 3.0 |

The thus dispersed composition was then completely dispersed with 1460 grams of cationic neoprene latex. This composition effected a seal in a jute packed joint.

EXAMPLE 8

The following ingredients were ground in a ball mill for 16 hours:

| | Grams |
|---|---|
| Water | 500.0 |
| Zinc oxide | 150.0 |
| NaOH | 0.8 |
| Tert-dodecyl thioether | 3.0 |

The resulting dispersion was then added to 1460 grams of cathionic neoprene latex and thoroughly dispersed. This composition effected a seal in a jute packed joint.

EXAMPLE 9

The following ingredients were ground in a ball mill for 16 hours:

| | Grams |
|---|---|
| Water | 500 |
| Sulfur | 150 |
| NaOH | 0.8 |
| Tert-dodecyl thioether | 3.0 |

The resulting composition was then thoroughly dispersed with 1460 grams cationic neoprene latex. This composition effected a seal in a jute packed joint.

I also found that, particularly when the packing required to be sealed consists of jute or other organic fiber, that modification of my sealant which includes cationic latex penetrates much more quickly and effectively, the positively charged latex having a marked attraction for the negatively charged organic fibers, not only increasing the speed of penetration, but also substantially increasing the strength of the seal. Not only so, but the ethylene oxide-rosin amine adduct and the long chain fatty acid amide, are corrosion inhibitors which would further contribute to the protection of the conduit or vessel being sealed.

Moreover, the sealant of my invention is non-toxic, non volatile, non-explosive, non-flammable when in liquid form, and non-flammable when in coagulated form when the latex is polychloroprene, and inert in the presence of aliphatic hydrocarbons such for instance as illuminating gas, and may be introduced into a conduit and withdrawn therefrom as described hereinabove without coaguation, so that the thus withdrawn sealant can be used again and again in the same manner. Not only so, but when thus introduced and withdrawn it not only penetrates and seals the joints, fibers and fissures, but it also leaves a thin film about the interior of the conduit or vessel, which coagulates and cures into a permanent seal against future fissures that may form in the conduit or vessel structure. This film, in the case of the product of Examples 1 and 2, may have a thickness of .002 inch to .003 inch. Also, the penetrated fissures, fibers, openings and joints are very substantially strengthened by the resultant coagulated and cured sealant, particularly when a reinforcing agent is contained therein.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim as new and desire to secure by Letters Patent is:

1. A stable, fluid, sealant composition for selectively sealing leaks by partially coagulating and curing as a sealing film in metallic conduits and vessels, said composition comprising
   an aqueous dispersion of a cationic polychloroprene latex, water,
   a catinoic surface active agent,
   a non-ionic surface active agent,
   a solid comminuted curing accelerator for the polychloroprene, and
   a solid comminuted curing agent for the polychloroprene, the total solids content being present in the range of about 5 to about 55% by weight, the cationic surface active agent being present in the range of about 0.5 to about 6% by weight, the non-ionic surface active agent being present in an amount less than the cationic surface active agent and in the range of about 1.2 to about 5% by weight, said composition being stable and non-coagulating prior to and after withdrawal from said conduits and vessels, but while under pressure being partially coagulatable therein as a thin coating on the walls of said conduits and vessels, and being repeatedly reusable until essentially all the polychloroprene solids are used up.

2. The composition of claim 1 in which the cationic surface active agent is an ethylene oxide rosin amine adduct.

3. The composition of claim 1 which comprises a second cationic surface active agent.

4. The composition of claim 4 in which the second cationic surface active agent is a long chain fatty acid amide.

5. The composition of claim 1 in which the non-ionic surface active agent is a tert-dodecyl thioether.

6. The composition of claim 1 which comprises a reinforcing agent selected from the following: carbon black, filamentous particles, and fiberglass.

7. The composition of claim 1 which comprises a low temperature cure accelerator selected from the following: thiocarbanilide and thiuramidisulfide.

8. The composition of claim 7 in which the curing agent is selected from the following: zinc oxide, magnesium oxide and lead oxide.

9. The composition of claim 1 which comprises additionally polyvinyl alcohol.

10. The composition of claim 1 which comprises as a thickening agent, methyl cellulose.

11. The composition of claim 1 in which the total solids content is in the range of about 30 to 55% by weight.

12. The composition of claim 1 in which the amount of curing agent is in the range of about 4 to 8% by weight.

References Cited

UNITED STATES PATENTS

| | | | |
|---|---|---|---|
| 2,535,869 | 12/1950 | Schneider et al. | 260—17.4 |
| 2,918,194 | 12/1959 | Kuigly et al. | 260—64 |
| 2,955,096 | 10/1960 | White | 260—33.6 |

FOREIGN PATENTS 676,592  7/1952  Great Britain.

OTHER REFERENCES

McDonough et al., neoprene latex type 950, E. I. du Pont report No. 54-6, October 1954, pp. 1–21.

SAMUEL H. BLECH, Primary Examiner

W. J. BRIGGS, Sr., Assistant Examiner

U.S. Cl. X.R.

260—29.7, 27, 746, 41.5, 17.5, 887, 739; 285—10